United States Patent [19]

Elliott et al.

[11] 4,372,863
[45] Feb. 8, 1983

[54] OIL COMPOSITIONS CONTAINING OIL-SOLUBLE, OXIDATIVELY AND MECHANICALLY DEGRADED ETHYLENE COPOLYMERS

[75] Inventors: Robert L. Elliott, Scotch Plains; Lawrence J. Engel, Green Brook; J. Brooke Gardiner, Mountainside, all of N.J.

[73] Assignee: Exxon Research & Engineering Co., Florham Park, N.J.

[21] Appl. No.: 81,050

[22] Filed: Oct. 2, 1979

Related U.S. Application Data

[60] Division of Ser. No. 911,693, Jun. 1, 1978, abandoned, which is a continuation of Ser. No. 787,033, Apr. 13, 1977, abandoned.

[51] Int. Cl.$^3$ .............................................. C10M 1/32
[52] U.S. Cl. ................................. 252/51.5 A; 252/55
[58] Field of Search ............................. 252/51.5 A, 55

[56] References Cited

U.S. PATENT DOCUMENTS

| | | | |
|---|---|---|---|
| 3,412,027 | 11/1968 | Morway et al. | 252/40.7 |
| 3,551,336 | 12/1970 | Jacobson et al. | 585/12 |
| 3,598,738 | 8/1971 | Biswell et al. | 585/7 |
| 3,691,078 | 9/1972 | Johnston et al. | 585/11 |
| 3,697,429 | 10/1972 | Engel et al. | 585/12 |
| 3,756,954 | 9/1973 | Abbott et al. | 252/55 |
| 3,769,216 | 10/1973 | Gordon et al. | 252/51.5 A X |
| 3,864,268 | 2/1975 | Culbertson et al. | 252/51.5 A X |
| 4,051,048 | 9/1977 | Elliott et al. | 252/51.5 R |
| 4,068,056 | 1/1978 | Engel et al. | 252/55 X |
| 4,098,710 | 7/1978 | Elliott et al. | 252/55 X |
| 4,113,636 | 9/1978 | Engel et al. | 252/51.5 A X |
| 4,145,493 | 3/1979 | Petrille et al. | 252/55 X |
| 4,208,310 | 6/1980 | Lundberg et al. | 260/23.5 A |
| 4,210,568 | 7/1980 | Makowski | 260/32.4 |

FOREIGN PATENT DOCUMENTS 991792 6/1976 Canada.
1001455 8/1965 United Kingdom.

Primary Examiner—Andrew Metz
Attorney, Agent, or Firm—Roland A. Dexter; Frank T. Johmann

[57] ABSTRACT

A lubricating oil composition comprising a major amount of lubricating oil and a viscosity index improving amount of an oil-soluble polymer composition comprising an ethylene copolymer, preferably an oxidatively and mechanically degraded ethylene copolymer, having an ethylene content of 26–79 weight percent (35–85 mole percent), a $C_3$ to $C_{18}$ higher alpha-olefin and from about 1–25 weight percent of an alkyl norbornene having from about 8 to 28 carbons, preferably ethyl norbornene and preferably at least a pour point depressing amount of a lubricating oil pour point depressant, e.g. an alkyl fumarate vinyl acetate copolymer, whereby superior low temperature viscometrics is provided to said lubricating oil composition.

6 Claims, No Drawings

OIL COMPOSITIONS CONTAINING OIL-SOLUBLE, OXIDATIVELY AND MECHANICALLY DEGRADED ETHYLENE COPOLYMERS

This application is a Division of Application Ser. No. 911,693, filed June 1, 1978 which is a continuation of Ser. No. 787,033 filed Apr. 13, 1977 both abandoned.

BACKGROUND OF THE INVENTION

1. Field of the Invention

This invention relates to novel lubricant additives and the preparation thereof. More particularly, it relates to improvement in the viscosity index of lubricating oils by addition thereto of a certain class of ethylene copolymers which provide said lubricating oil with excellent low temperature viscometric properties relative to other ethylene copolymeric viscosity-index improvers.

2. Description of the Prior Art

As is well known to those skilled in the art, lubricating oils may be evaluated by many criteria each of which relates to the proposed use of the oil. One of the more important of these criteria is the viscosity index.

It is known that the viscosity index of lubricating oils can be usefully modified by the addition of viscosity index (V.I.) improvers such as polyisobutylenes, polymethacrylates, copolymers of polymethacrylate esters, copolymers of vinyl esters and fumaric acid esters, polyacrylates, polystyrenes, and terpolymers of styrene, methacrylate esters and nitrogen-containing esters and ethylene copolymers including ethylene-higher alpha-olefin copolymers and terpolymers.

Recently, ethylene-propylene copolymers have become widely used as viscosity improvers in lubricating oils because of the low treat levels and improved viscometric properties. However, the market requires different molecular weight grades, which have different degrees of thickening effect—usually called Thickening Efficiency or T.E.—so as to be operable with different viscosity mineral oils. Although the preparation of each of such copolymer grades can be by direct synthesis, the different molecular weight grades can be produced by degradation of an ethylene-propylene copolymer so as to produce lower molecular weight versions. It is advantageous to use the degradation approach since it is more economical to make a large run of copolymer in a large scale polymer plant, and then to use this run as a base material which is then broken down into lower molecular weight grades in order to meet requirements of the viscosity index improver mark. There are various means to achieve such degradation including: heating an amorphous rubbery ethylene-propylene copolymer for 3 to 30 minutes at from 260° to 420° C. with the exclusion of air (see United Kingdom Pat. No. 1,001,455); extruding and heating an ethylene copolymer first at 150°–280° C. until molten and then at a temperature of 300°–500° C. with the exclusion of air (see Canadian Pat. No. 991,792); and, by oxidative and mechanical degradation, as by mastication of ethylene-propylene copolymers preferably free of other monomers such as dienes (see U.S. Pat. No. 3,769,216). It is known that ethylene terpolymers which contain dienes, e.g. vinyl norbornene, are not suitable for mechanical degradation as by mastication in the presence of air or oxygen whereby oxidation occurs since this degradation technique produces excessive amounts of gel particles which are oil insoluble.

Frequently, it is also found that the presence of ethylene copolymeric V.I. improvers in conventionally-formulated lubricating oils undesirably raise the low temperature pour point of a lubricating oil containing a pour point depressant. This appears to occur because these copolymeric V.I. improvers interfere with the operation of the lubricating oil pour point depressants. Representative of these copolymeric V.I. improvers that are frequently incompatible with pour depressants are ethylene-propylene copolymers containing 60–80 mole percent of ethylene (see U.S. Pat. No. 3,697,429).

One approach to overcoming this incompatibility problem is taught in U.S. Pat. No. 3,697,429 wherein the V.I. improver is a mixture of two ethylene copolymers, i.e. a first copolymer of ethylene and a $C_3$ to $C_{18}$ higher alpha-olefin having an ethylene content of 50–95 mole percent (40–83 wt. percent) and a second copolymer ethylene and a $C_3$ to $C_{18}$ higher alpha-olefin having an ethylene content of 5–80 mole percent (3–70 weight percent) with the ethylene content of said first copolymer being at least 5 mole percent (4 wt.%) more than the ethylene content of said second copolymer. These ethylene copolymers can include diolefins containing about 6–28 carbon atoms, e.g. 5-vinyl-2-norbornene, as a third monomer. The ethylene copolymers of the mixture are chosen so as to provide a weight average ethylene content comparable to the characteristic modal weight percent at which the pour point is at a maximum for the particular lubricating oil.

It is an object of this invention to provide an improved ethylene copolymer viscosity index improver, preferably one that can be readily degraded to a lower molecular weight.

SUMMARY OF THE INVENTION

It has been discovered that an ethylene $C_3$–$C_{18}$ alpha-olefin terpolymer containing at least about 1 wt. % of a $C_1$–$C_{21}$ alkyl substituted norbornene has improved compatibility with pour point depressants and can be, if desired, readily reduced in molecular weight by oxidative and mechanical degradation without deleterious formation of oil-insoluble gel particles.

Thus the above objective can be met by a lubricating oil composition which comprises according to this invention a lubricating oil, at least a viscosity index improving amount of an oil-soluble ethylene copolymer having: a number average molecular weight ($\overline{M}_n$) of at least 5,000; a molecular weight distribution as determined by the ratio of weight average molecular weight ($\overline{M}_w$) to number average molecular weight ($\overline{M}_w/\overline{M}_n$) of less than 8; and a thickening efficiency in the range of 1.0 to 3, preferably 1.2 to 2.4, when compared to polyisobutylene having a viscosity average molecular weight ($\overline{M}_v$) of 20,000; and containing 26–79 weight percent (35–85 mole percent) of ethylene, of at least one $C_3$ to $C_{18}$ alpha-olefin, such as propylene, and from about 1 to 25, preferably 2 to 10, weight percent of a $C_1$–$C_{21}$ alkyl norbornene, such as ethyl norbornene, and preferably at least a pour point depressing amount of a lubricating oil pour point depressant. In a preferred embodiment, the ethylene copolymer is oxidatively and mechanically degraded, preferably by mastication in the presence of air, at a temperature of from about 95° C. to 260° C. for from 0.25 to 20 hours whereby the thickening efficiency is reduced from a value greater than about 3, e.g. about 4, to within the range of 1.0 to 3.0, preferably from 1.2 to 2.4, and the oxygen content of said ethylene copolymer is from about 0.005 to 6, preferably 0.05 to 3, wt. % based on the total weight of said copolymer. The mechanically degraded and oxidized copolymer can be reacted with polyamines for dispersancy whereby multifunctionalization is provided, i.e. said copolymer contains from about 0.005 to 4, preferably 0.05 to 2, percent by weight of nitrogen, based on the total weight of said copolymer.

Thickening efficiency (T.E.) is defined as the ratio of the weight percent of a polyisobutylene (sold by Exxon Chemical Co., New York, N.Y. as PARATONE N ®) having a Staudinger Molecular Weight of 20,000, required to thicken a solvent extracted neutral mineral lubricating oil, having a viscosity of 150 SUS at 37.8° C., a viscosity index of 105 and an ASTM pour point of 17.8° C., (Solvent 150 Neutral) to a viscosity of 12.4 centistokes at 98.9° C., to the weight of a test copolymer required to thicken the same oil to the same viscosity at the same temperature.

DESCRIPTION OF THE INVENTION

Ethylene copolymers containing ethylene, a longer chain alpha-olefin, norbornene and alkenyl substituted norbornene monomers are known as V.I. improvers. U.S. Pat. No. 3,598,738 teaches that oil-soluble ethylene copolymers containing comonomers such as $C_3-C_{12}$ alpha-olefins, terminally unsaturated non-conjugated $C_5-C_8$ diolefins, 2-norbornene and 5-methylene-2-norbornene and mixtures thereof can be used as viscosity index improvers for mineral oil compositions.

In accordance with the teachings of this invention, the alkyl norbornenes which are an essential class of monomers for copolymerization with ethylene and the $C_3-C_{18}$ higher alpha-olefins are alkyl substituted norbornenes containing about 8-28 carbon atoms, preferably about 8-12 carbon atoms. Suitable norbornene monomers include methylnorbornene, isopropylnorbornene, butylnorbornene, pentylnorbornene, dodecylnorbornene, octadecylnorbornene eicosylnorbornene, etc., preferably ethylnorbornene. Mixtures are also useful.

The longer chain alpha-olefins which may be used individually or as a mixture in the preparation of the ethylene copolymers used in the practice of this invention are those monomers containing from 3 to about 18 carbon atoms. These alpha-olefins may be linear, or branched where the branching occurs three or more carbon atoms from the double bond. While a single olefin is preferable, mixtures of $C_3$ to $C_{18}$ olefins may be employed. Examples of suitable $C_3$ to $C_{18}$ alpha-olefins include propylene, 1-butene, 1-pentene, 1-hexene, 1-heptene, 1-octene, 1-nonene, 1-decene, 5-methyl-1-hexene, dimethyl-1-pentene, 4-methyl-1-heptene and mixtures thereof. It is preferred, however, that the ethylene monomer be copolymerized with propylene.

In general, the ethylene, $C_3-C_{18}$ higher alpha-olefin and alkylnorbornene copolymers used in accordance with this invention are derived from about 26 to 79% by weight of ethylene, about 20 to 73% by weight of $C_3-C_{18}$ alpha-olefins and 1 to 25%, preferably 2 to 10, wt. % of alkylnorbornene monomers.

Preferably the copolymers are derived from about 40 to 65% by weight ethylene, about 34 to 59 wt. % of a $C_3-C_{18}$ alpha-olefin and about 2 to 10% by weight of alkyl norbornene. The most preferred copolymers are derived from 53 wt. % of ethylene, 38.3 wt.% of propylene and 8.7 wt.% of ethylnorbornene.

The copolymers of this invention may be characterized by the following properties:

TABLE I

| | Broad Range | Preferred Range |
|---|---|---|
| Ethylene Content | 26–79 wt. % | 40–65 wt. % |
| Alkylnorbornene Content | 1–25 wt. % | 2–10 wt. % |
| Degree of Crystallinity | 0–37% | 0–15% |
| $M_n \times 10^{-3}$ | 5–300 | 10–70 |
| $M_w \times 10^{-3}$ | 10–800 | 10–400 |
| $M_w/M_n$ | <8 | <6 |
| Branching | <10 | <4 |

These ethylene copolymers may be readily prepared by means well known in the prior art by forming a mixture of the requisite three monomer components containing the above components by weight as set forth in Table I.

Mixtures of these monomers may be used, i.e. more than one higher alpha-olefin and/or more than one alkylnorbornene may be employed. Other compatible components, including those which are copolymerizable to form tetrapolymers, may be present, etc. In no instance should the diolefin content exceed 1 wt. %, preferably it should be less than 0.8 wt. %, since the ethylene copolymers of this invention containing an excessive amount of a diolefin cannot be usefully degraded in accordance with degradation means of this invention.

In general, these copolymers can be produced by a catalyst composition which comprises a principal catalyst consisting of a transition metal compound from Groups IVb, Vb and VIb of the Periodic Table of the Elements, particularly compounds of titanium and vanadium, e.g. $VOCl_3$, and organometallic reducing compounds from Groups IIa, IIb and IIIa, particularly organo-aluminum compounds, e.g. $(C_2H_5)_3Al_2Cl_3$, which are designated as cocatalysts. Examples of suitable catalysts and preferred reaction conditions are shown in U.S. Pat. No. 3,551,336.

Polymerization may be effected to produce copolymers by passing ethylene, an alpha $C_3-C_{28}$ monoolefin, preferably propylene, and the alkyl substituted norbornene monomer, preferably ethylnorbornene, and hydrogen into a liquid inert-diluent-solvent reaction medium containing catalyst and cocatalyst in catalytic amounts. The nonreactive reaction medium may be an aromatic hydrocarbon such as toluene, a saturated aliphatic hydrocarbon such as heptane, pentane, and hexane, or a chlorohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as nitrogen.

During polymerization, the reaction mixture may be agitated and maintained at temperatures of −40° to 100° C., preferably −10° C. to 70° C., optimally about 30° C. and pressures of 0–1000 psig, preferably 0–300 psig, optimally 60 psig, during a period of 1–300 minutes, preferably 3–60 minutes, optimally 15 minutes. At the end of this period, the reaction mixture may be worked up to separate the product copolymer or the mixture may be used as such for degradation.

The ethylene copolymers of the invention could be alternatively produced by hydrogenation of the copolymers of the prior art which incorporate alkenyl norbornenes, e.g. 5-ethylidene-2-norbornene, as the third comonomer. Hydrogenation to remove the unsaturation of the pendant alkenyl group can be readily carried out by the process described in U.S. Pat. No. 3,795,615 (see Example 1): e.g. dissolving the copolymer in cyclohexane; adding Raney nickel as the catalyst; pressurizing the system with hydrogen to about 3600 psi by use of a metal bomb; thereafter heating the contents at 250° C. for about 16 hours; and, working up the reaction mixture to recover the hydrogenated copolymer. The hydrogenated copolymer can then be used as a V.I. improver or subjected to oxidation-amination as further described herein.

OXIDATION AND MECHANICAL DEGRADATION OF THE COPOLYMER

It has been discovered that these ethylene copolymeric viscosity-index improving additives of the invention can be readily degraded, i.e. reduced in molecular weight, by mastication in air such as by a mechanical shearing machine, e.g. a Banberry mixer. This process results in shear stable ethylene copolymers which when incorporated in lubricating oils provide "stay-in-grade" performance which performance is important if not essential for lubrication of modern high performance engines.

This finding that these materials may be masticated in a high shear machine is surprising since commercially available terpolymers having over 1 wt. % cyclic diolefin, e.g. Vistalon 2504 sold by Exxon Chemical, Houston, Tex. or over 1 wt. % linear diolefin, e.g. Nordel 1320 sold by E. I. duPont de Nemours of Wilmington, Del. form oil-insoluble gel upon mastication in air. This gel formation is not acceptable since the oxidized-masticated terpolymers are each insoluble in mineral oil and are no longer useful as viscosity modifiers.

For the purpose of this invention, the mechanical-oxidative degradation of the ethylene copolymer may be done with a single piece of equipment, or may be done in stages. It is preferred to operate in the absence of solvent or fluxing oil so the ethylene copolymer is readily exposed to air as taught in French Application 75,23806. Useful equipment includes Banberry mixers and mills having adjustable gaps, which devices may be enclosed in jacketed containers through which a heating medium may be passed such as superatmospheric steam, or heated DOWTHERM ®. When degradation has reached a desired level, as determined by oxygen uptake and reduction in thickening efficiency (T.E.) as defined before, a fluxing oil may be added to the degraded ethylene copolymer. Usually enough oil is added to provide a concentration of degraded copolymer in the range of about 5 weight percent to 50 weight percent based on the weight of the total resulting solution. The resulting oil solution may thereafter be utilized as an article of commerce as a lubricant additive or readily incorporated into the lubricating oil.

Useful temperatures for mechanical-oxidative degrading of the ethylene copolymers are in the range of about 95° C. to 260° C. The time required to achieve satisfactory results will depend on the type of degrading or mastication equipment, the temperature of degrading, and particularly the speed of rotation if using a blade mixer as the degrading or masticating device. In this regard, the Bramley Beken Blade Mixer has been found to be particularly useful in providing in a single piece of equipment, the desired degree of mastication or milling and oxidative degradation. This mixer, which is equipped with a variable speed drive, has two rollers, fitted with helically disposed knives geared so that one roller revolves at one-half the speed of the other. The rollers are journaled in a jacketed reactor having two hemispherical halves in its base, which conform to the radii of the two rollers. Superheated steam, or heated DOWTHERM ®, may be circulated through the jacket to provide the desired temperature. With this mixer satisfactory reductions in thickening efficiency may be obtained in from 0.25 to 20 hours in the temperature range of about 95° C. to 260° C.

Instead of using a fluxing oil, other inert solvents can be used in preparing a fluid solution of the ethylene copolymer which inert solvents include a liquid hydrocarbon such as naphtha, hexane, cyclohexane, dodecane, mineral oil, biphenyl, xylene or toluene, a lubricating oil of the solvent neutral type, a white lubricating oil, chlorinated solvents such as dichlorobenzene isopars, etc. The amount of the solvent is not critical as long as a sufficient amount is used to result in the fluid solution of the ethylene copolymer so as to facilitate the mechanical-oxidative degradation. Such a solution as earlier described usually contains from about 50 to about 95 weight percent of the solvent.

The oil-soluble ethylene copolymeric additives including the oxygen and nitrogen-containing derivatives of this invention are incorporated in lubricating oil compositions, e.g., automotive or diesel crankcase lubricating oil, in at least viscosity index improving amounts and generally in concentrations within the range of about 1 to 15 weight percent, preferably 2 to 7 weight percent of the total composition.

Further, these oil-soluble degraded ethylene copolymeric V.I. improving materials of the invention can be derivatized into multifunctional V.I. improvers by addition of sludge dispersant activity. This is readily accomplished by reaction with or grafting of amine compounds into said ethylene copolymeric materials.

Useful amine compounds for introducing sludge dispersant activity include mono- and polyamines of about 2 to 60, e.g., 3 to 20, total carbon atoms and about 1 to 12, e.g. 2 to 6, nitrogen atoms in the molecule, which amines may be hydrocarbyl amines or may be hydrocarbyl amines including other groups, e.g., hydroxy groups, alkoxy groups, amide groups, imidazoline groups, and the like. Preferred amines are aliphatic saturated amines, including those of the general formulae:

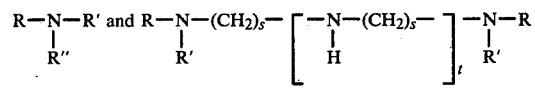

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy or amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: mono-, di- and tri-tallow amines; 1,2-diaminoethane; 1,3-diaminopropane; 1,4-diaminobutane; 1,6-diaminohexane; diethylene triamine, triethylene tetraamine, tetraethylene pentamine; 1,2-propylene diamine; di-(1,2-propylene) triamine; di-(1,3-propylene) triamine; N,N-dimethyl-1,3-diaminopropane; N,N-di-(2-aminoethyl) ethylene diamine; N,N-di-(2-hydroxyethyl)-1,3-propylene diamine; 3-dodecyloxypropylamine; N-dodecyl-1,3-propane diamine, tris-hydroxymethyl methylamine, diisopropanol amine and diethanol amine.

Other useful amine compounds include: alicyclic diamines such as 1,4-di-(aminomethyl) cyclohexane, and heterocyclic nitrogen compounds such as imidazolines and N-aminoalkyl piperazines of the general formula:

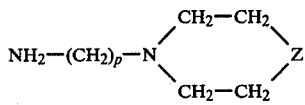

wherein Z is oxygen or NG and G is independently selected from the group consisting of hydrogen and $\Omega$-aminoalkylene radicals of from 1 to 3 carbon atoms; and p is an integer of from 1 to 4. Non-limiting examples of such amines include 2-pentadecyl imidazoline; N-(2-aminoethyl) piperazine; N-(3-aminopropyl) piperazine; N,N'-di-(2-aminoethyl) piperazine; and n-propyl aminomorpholine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylene-tetramine, tetraethylene pentamine and isomeric piperazines. Low cost poly(ethylene amines) compounds having a composition approximating tetraethylene pentamine are available commercially under the trade name Polyamine 400 (PA-400) marketed by Jefferson Chemical Co., New York, N.Y.. Similar materials may be made by the polymerization of aziridine, 2-methyl aziridine and azetidine.

Still other amines separated by hetero atom chains such as polyethers or sulfides can be used.

Introduction of the sludge dispersant activity can be by various means including: reacting the oil-soluble ethylene copolymer with an oxygen-containing gas and said amine compound at a temperature of from about 130° C. to about 300° C. while mechanically degrading said copolymer according to the disclosure of U.S. Patent Application Ser. No. 555,398 filed Mar. 5, 1975 now issued as U.S. Pat. No. 4,068,056; forming an anion of said oxidized ethylene copolymer and reacting said anion with acrylonitrile and thereafter derivitizing the reaction product with amines as is taught in U.S. Patent Application Ser. No. 732,143 filed Oct. 13, 1976 and now issued as U.S. Pat. No. 4,051,048; and, reacting said oxidized ethylene copolymer with said amines as taught according to the amination procedure of U.S. Pat. No. 3,864,268.

The copolymers of the invention can be employed alone in lubricant compositions or they can be employed in combination with other viscosity index improvers. If desired, the copolymers may be employed in combination with other additives, for example, pour point depressants such as polymethacrylates; ashless dispersants such as the reaction product of polyisobutenyl succinic anhydride with tetraethylene pentamine, detergent type additives such as calcium nonyl sulfurized phenate and magnesium phenyl sulfonate; zinc anti-oxidants such as dialkyl dithiophosphate, etc. It is contemplated that the invention polymers can be blended with other polymers so as to impart various desired properties thereto.

It is a feature of this invention that significant improvement in low temperature viscometrics may be achieved without undesirable effect on pour point when a pour point depressant is present in a formulated oil. This improvement may be particularly noted when the lubricating oil contains the pour point depressant in amount of 0.1 wt. percent to 1.0 wt. percent, preferably 0.4 wt. percent. Illustrative pour point depressants which may be present in the compositions of this invention include chlorinated wax naphthalenes condensates as described in U.S. Pat. No. 2,174,246, $C_{10}$-$C_{18}$ alkyl methacrylate polymers as described in U.S. Pat. Nos. 2,091,627 and 2,100,993, $C_{10}$-$C_{18}$ alkyl acrylates, copolymers of di-n-alkyl fumarate and vinyl acetate as disclosed in U.S. Pat. Nos. 2,936,300 and 3,048,479, ethylene-vinyl acetate copolymers, and copolymers of styrene and alpha-olefins and copolymers of styrene and maleic anhydride.

DESCRIPTION OF THE PREFERRED EMBODIMENTS

Practice of this invention may be illustrated by the following examples which show how the invention may be utilized. In these examples, as elsewhere in this specification, all parts are by weight unless specifically indicated otherwise.

ETHYLENE COPOLYMERS CONTAINING ALKYL NORBORNENE

A series of ethylene-propylene copolymers containing alkyl norbornenes were produced with varying ethylene and/or alkyl norbornene, i.e. ethyl norbornene, content. These copolymers, of which there are six examples, are designated hereafter as EPEN-1 through 6. These EPEN copolymers are prepared from ethylene, propylene and ethyl norbornene by varying the feed ratio of the three comonomers in the polymerization process carried out essentially as follows (EPEN-5 copolymer is produced under these specific conditions with all parts being parts by weight): 3.2 parts of ethylene, 4.7 parts of propylene, 0.82 parts of ethyl norbornene and $2.35 \times (10^{-7})$ parts of hydrogen was admitted to the reactor with 100 parts of n-hexane, 0.009 parts of vanadium oxychloride and 0.032 parts ethyl aluminum sesquichloride. The catalyst compostion was characterized by a molar ratio of Al/V of 5. Residence time was about 20 minutes. Polymerization temperature was 28° C. and the pressure was 60 psig. Steam distillation yielded the solvent-free ethylene copolymer of the invention. Copolymers EPEN 1-4 and 6 were prepared by appropriate change in the feed stock ratio. The specific compositions are set forth hereafter:

| EPEN Copolymer | Wt. % Ethylene | Wt. % Propylene | Wt. % Ethyl Norbornene |
|---|---|---|---|
| 1 | 45.3 | 51.0 | 3.70 |
| 2 | 46.3 | 49.78 | 3.92 |
| 3 | 47.3 | 49.37 | 3.38 |
| 4 | 50.9 | 45.61 | 3.49 |
| 5 | 53.0 | 38.28 | 8.72 |
| 6 | 58.0 | 32.30 | 9.70 |

ETHYLENE PROPYLENE COPOLYMERS

A series of ethylene propylene copolymers of varying ethylene content were used for comparative purposes.

These 4 commercially available copolymers produced generally according to U.S. Pat. No. 3,697,429 are designated herein as EPC-1 through 4 with the following indicated compositions:

| EPC Copolymer | Wt. % Ethylene | Wt. % Propylene |
|---|---|---|
| 1 | 57.5 | 42.5 |
| 2 | 55.4 | 44.6 |
| 3 | 53.0 | 47.0 |
| 4 | 51.5 | 48.5 |

EXAMPLE 1

In this example, a comparison of oil blend characteristics of a reference oil containing the copolymers of the invention, i.e. EPEN 1-6, is made with samples of said oil containing the ethylene-propylene copolymers of the prior art, i.e. EPC 1-4. The reference oil is a mixture of 300 N and 150 N base oils blended with about 0.25 wt. % (a.i.) of a commercially available alkyl fumarate-vinyl acetate copolymer pour depressant. Table I illustrates the effect of both types of ethylene copolymers on the blend characteristics of said reference oil when sufficient copolymer is added to provide a 98.9° C. viscosity of about 12.4 centistokes.

TABLE I

| Oil Blend | Copolymer Added | Wt. % Ethylene of Copolymer | Centistokes at 98.9° C. | T.E. | Poises at 0° F. | Pour Pt. °F. (ASTM D-97) |
|---|---|---|---|---|---|---|
| I-A | EPEN-1 | 45.3 | 13.06 | 2.1 | 26.0 | −35 |
| I-B | EPEN-2 | 46.3 | 12.55 | 2.5 | 25.0 | −35 |
| I-C | EPEN-3 | 47.5 | 12.51 | 2.4 | 25.0 | −35 |
| I-D | EPEN-4 | 50.9 | 12.36 | 2.3 | 25.2 | −35 |
| I-E | EPEN-5 | 53.0 | 12.28 | 2.5 | 25.2 | −40 |
| I-F | EPEN-6 | 58.0 | 12.09 | 2.4 | 24.1 | −35 |
| I-G | EPC-1 | 57.5 | 12.46 | 2.8 | 22.8 | 0 |
| I-H | EPC-2 | 55.4 | 12.99 | 2.8 | 34.1 | − 5 |
| I-I | EPC-3 | 53.0 | 12.33 | 2.8 | 23.8 | −20 |
| I-J | EPC-4 | 51.5 | 12.46 | 2.8 | 24.7 | −35 |
| I-K | no copolymer | — | 6.2 | — | 19.0 | −35 |

A comparison of the pour points of Oil Blends G-J illustrates the teachings of U.S. Pat. No. 3,697,429 that there is a characteristic model weight percent ethylene content of the ethylene copolymer V.I. improver (for this reference oil at about 57.5 wt. % ethylene) at which the pour point is a maximum. It is believed that this result occurs, at least in part, because the ethylene-propylene copolymer V.I. improvers interfere with the operation of conventional lubricating oil pour point depressants. In contrast, the pour points of Oil Blends A-F illustrate the advantage of the ethylene copolymers of this instant invention over the prior art ethylene-propylene copolymer V.I. improvers. It is apparent that none of the ethylene copolymers, i.e. EPEN 1-6, provoke a pour point elevation due to the above-described interactions as a function of ethylene content, in fact, a comparison of EPEN-6 with EPC-1 both which have an ethylene content of about 58 wt.% shows a pour point improvement of about 35° F.

EXAMPLE 2

In this example, the reference oil of Example 1 is replaced with a Solvent 150N high pour base stock in order to again compare the influence of the copolymers of the invention with the ethylene-propylene copolymers of the prior art on the blend characerisitcs of another base stock containing the pour depressant of Example 1.

TABLE II

| Oil Blend | Copolymer Added | Viscosity, Centistokes at 98.9° C. | Viscosity, Poises °F. 17.8° C. Vis, P | Wt. % Pour Depressant (a.i.) Added | Pour Pt. °F. (ASTM D-97) |
|---|---|---|---|---|---|
| II-A, | EPEN-1 | 14.85 | 22.5 | .05 | −20 |
| II-A' | " | 15.09 | 22.7 | .1 | −30 |
| II-B | EPEN-2 | 15.08 | 22.2 | .05 | −20 |
| II-B' | " | 15.12 | 21.8 | .1 | −25 |
| II-C | EPEN-3 | 14.86 | 22.1 | .05 | −15 |
| II-C' | " | 15.03 | 22.3 | .1 | −30 |
| II-D | EPEN-4 | 15.28 | 22.5 | .05 | −15 |
| II-D' | " | 15.30 | 22.5 | .1 | −15 |
| II-E | EPEN-5 | 15.00 | 22.3 | .05 | −20 |
| II-E' | " | 14.74 | 22.2 | .1 | −25 |
| II-F | EPEN-6 | 15.16 | 22.5 | .06 | +10 |
| II-F' | " | 15.05 | 22.2 | .1 | −10 |
| II-G | EPC-1 | 15.00 | 22.5 | .05 | +15 |
| II-G' | " | 14.79 | 22.5 | .1 | +15 |
| II-H | EPC-2 | 15.26 | 16.8 | .05 | +15 |
| II-H' | " | 15.28 | 23.0 | .1 | +15 |
| II-I | EPC-3 | 14.75 | 23.0 | .05 | +15 |
| II-I' | " | 15.18 | 23.7 | .1 | +10 |
| II-J | EPC-4 | 15.22 | 23.3 | .05 | − 5 |
| II-J' | " | 15.22 | 23.5 | .1 | −15 |
| II-K | no copolymer | — | — | 0 | +10 |
| II-K' | " | — | — | .05 | −15 |
| II-K" | " | — | — | .1 | −25 |

Table II illustrates that again the ethylene-propylene copolymer V.I. improvers elevate the pour point of the nominally pour point depressed base stock (compare Oil Blend II-G' with Oil Blend II-K") whereas the ethylene copolymers of the invention generally (except for EPEN-6) do not interfere with the operation of conventional lubricating oil pour point depressants. Again, a comparison of Oil Blend II-I with Oil Blend II-E (both of which have V.I. improvers which contain 53 wt. % ethylene) shows that the ethylene-propylene copolymer detrimentally effects the blend pour points by increasing it at least 30° F.; whereas, the ethylene copolymer of the invention does not interfere (a blend pour point advantage for the same ethylene content copolymers of at least 30° F. when practicing this invention).

EXAMPLE 3

In this example, the commercial utility of this instant invention in a commercial base stock corresponding to a Pennsylvania oil having a +15° F. pour point blended with 0.15 wt.% pour depressant and 9 wt.% detergent inhibitor package is illustrated by comparison with a commercially available ethylene-propylene copolymer V.I. improver (Paratone 715 sold by Exxon Chemical Co., Houston, Tex.). The resulting 10 W/40 multigrade blends were prepared by addition of sufficient V.I. improver to provide a 98.9° C. viscosity of about 15 centistokes. The results are shown in Table III.

TABLE III

| Oil Blend | Copolymer Added | Viscosity Centistokes 98.9° C. | Pour Point °F. (ASTM D-97) |
|---|---|---|---|
| III-A | EPEN-1 | 14.71 | −35 |
| III-B | EPEN-2 | 15.01 | −35 |
| III-C | EPEN-3 | 15.31 | −35 |
| III-D | EPEN-4 | 14.99 | −35 |
| III-E | EPEN-5 | 15.16 | −25 |
| III-F | EPEN-6 | 15.20 | −20 |
| III-L | Paratone 715 | 15.10 | −35 |

EXAMPLE 4

In this example, an ethylene copolymer of this instant invention is oxidatively and mechanically degraded by mastication in air without gel formation. In contrast, mastication in air under similar conditions of Vistalon 2504 and Nordel 1320 results in gel formation as seen in Table IV. Vistalon 2504 (Exxon Chemical Company) is an EPDM (ethylene-propylene-diene monomer) terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}_n$ is about 47,000, the $\overline{M}_v$ is about 145,000 and the $\overline{M}_w$ is about 174,000.

Nordel 1320 (DuPont) is a terpolymer having a Mooney viscosity at 212° F. of about 25 and having about 53 wt. % of ethylene, about 3.5 wt. % of 1,4-hexadiene and about 43.5 wt. % of propylene.

TABLE IV

Mastication In Air After 5 Hours

| | Copolymer in Reference Oil of Example 1 | | | | | |
|---|---|---|---|---|---|---|
| | EPEN-5[1] | | Vistalon[2] 2504 | | Nordel[3] 1320 | |
| | Initial | Final | Initial | Final | Initial | Final |
| Wt. % Copolymer | 0.7 | 1.4 | 0.8 | 1.2 | 1.0 | 0.5 |
| Kinematic Viscosity at 98.9° C. Centistokes | 11.62 | 14.98 | 13.36 | insoluble | 14.98 | insoluble |
| Thickening Efficiency | 2.6 | 1.3 | 2.78 | gel | 2.50 | gel |

Mastication Conditions:

TABLE IV-continued

Mastication In Air After 5 Hours

| | blade speed (rpm) | Temp. °C. |
|---|---|---|
| 1. | 68 | 191–204 |
| 2. | 68 | 179–196 |
| 3. | 68 | 185–218 |

EXAMPLE 5

Illustrative of a process for preparing the aminated derivative of the oxidized ethylene copolymer of the invention, the masticated in air ethylene-propylene-ethyl norbornene copolymer of Example 4 can be dissolved in Solvent 100 N oil to about 7 wt.%. 25 grams of this oil solution is condensed with 0.7 grams of tetraethylene pentamine at 2 hours at 160° C. while stripping with nitrogen. The product copolymer will have not only V.I. improving properties but also sludge dispersant activity.

The invention in its broader aspect is not limited to the specific details shown and described and departures may be made from such details without departing from the principles of the invention and without sacrificing its chief advantages.

What is claimed is:

1. A lubricating oil composition comprising a major amount of lubricating oil and a viscosity index improving amount of an oil-soluble oxidatively and mechanically degraded ethylene copolymer having an ethylene content of from about 26–79 weight percent ethylene, from about 1.0–25 wt. % of a $C_1$–$C_{21}$ alkyl norbornene and the balance being at least one $C_3$ to $C_{18}$ alpha-olefin, said copolymer having a number average molecular weight ($\overline{M}_n$) of at least 5,000; a molecular weight distribution as determined by the ratio of weight average molecular weight ($\overline{M}_w$) to number average molecular weight ($\overline{M}_w/\overline{M}_n$) of less than 8; and, a thickening efficiency in the range of 1.0 to 3, when compared to polyisobutylene having a viscosity average molecular weight ($\overline{M}_v$) of 20,000 and, an oxygen content of from about 0.005 to 6 wt. % based on the total weight of said copolymer.

2. A lubricating composition according to claim 1 wherein said ethylene copolymer has a ($\overline{M}_w/\overline{M}_n$) ratio of less than 6, a thickening efficiency of 1.2 to 2.4 and a ($\overline{M}_n$) of from about 10,000 to 70,000, and an oxygen content of from about 0.05 to 3 weight percent.

3. A lubricating composition according to claim 2 wherein said higher alpha-olefin is propylene, said alkyl norbornene is ethyl norbornene and said composition contains at least a pour depressing amount of a lubricating oil pour depressant.

4. A composition according to claim 1 wherein said copolymer is reacted with an amount of an amine compound selected from the group consisting of nitrogen compounds having the general formulae:

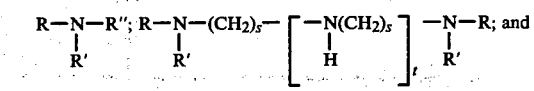

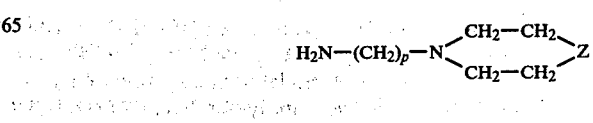

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy alkylene radicals; $C_2$ to $C_{12}$ amino alkylene radicals; $C_1$ to $C_{12}$ alkylamino $C_2$ to $C_6$ alkylene radicals; Z is 0 or N; G is from the group consisting of hydrogen and $\Omega$-amino alkylene radicals of from 1 to 3 carbon atoms; s is a cardinal number of from 2 to 6; t is a cardinal number of from 0 to 10; and p is an integer of from 1 to 4 sufficient to provide a nitrogen content of said copolymer ranging from about 0.01 to 0.5 weight percent.

5. A composition according to claim 4 wherein said amine compound is an alkylene polyamine containing from 2 to 6 nitrogen per molecule.

6. A composition according to claim 1 wherein said ethylene copolymer comprises the reaction product obtained by: masticating in air an ethylene copolymer having an ethylene content of from about 26 to 79 weight percent, from about 20 to 73 weight percent of $C_3$–$C_{18}$ alpha-olefins and from about 2 to 10 weight percent of alkyl norbornene containing about 8 to 12 carbon atoms, and a thickening efficiency greater than 3.0.

* * * * *